Jan. 7, 1958  A. BERLINER  2,818,647
DENTAL INSTRUMENT
Filed Nov. 22, 1954
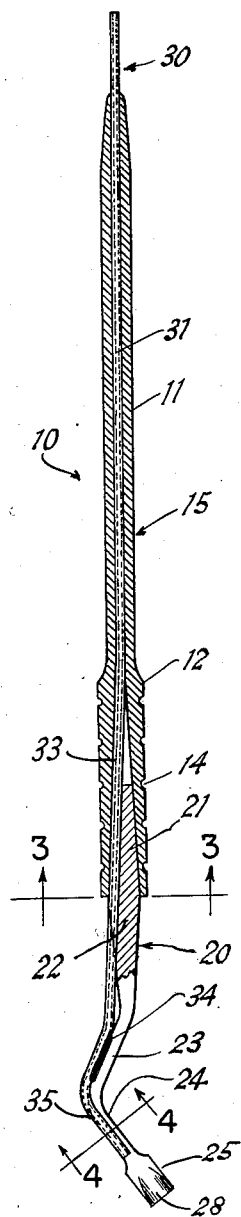
FIG. 1
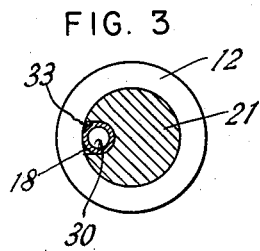
FIG. 3
FIG. 4
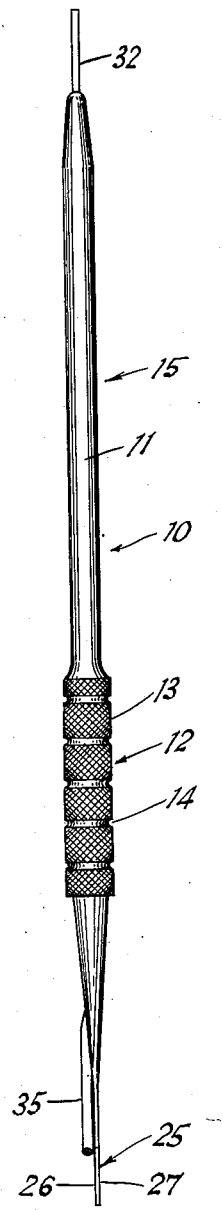
FIG. 2
INVENTOR
Abraham Berliner
BY
ATTORNEY

United States Patent Office 2,818,647
Patented Jan. 7, 1958

2,818,647

DENTAL INSTRUMENT

Abraham Berliner, New York, N. Y.

Application November 22, 1954, Serial No. 470,170

4 Claims. (Cl. 32—50)

This invention relates to dental instruments and, more particularly, to an improved scaling or planing instrument designed for the localized application of oxygen to affected areas during periodontal treatments.

With the development of oxygen hunger in a localized injured area, there is an exaggerated breakdown of cellular and plasma protein. Pyruvic acid is considered the unit of cellular energy, and is derived from the breakdown of glucose, carbohydrates, fats or proteins. In normal cellular metabolism, pyruvic acid is oxidized to form carbon dioxide and water. This process is defined as glycolysis, while the formation of glycogen from fat or protein to form the pyruvic acid unit is called gluconeogensis. If oxygen is lost from the area, lactic acid is formed.

It has been established that glucose is formed by injured cells. Since in the inflammatory process normal carbohydrate supply is reduced along with oxygen, glycogen is derived from the protein breakdown in the plasma exudate. As long as the exudate remains alkaline, polymorphonuclear leukocytes are the predominating cellular elements. If the inflammatory reaction extends either for a protracted period of time or is greatly intensified, the glycogen is reduced along with increased loss of oxygen (locally) and the lactic acid concentration correspondingly increases. The carbon dioxide also tends to drop, locally, with the resultant decrease in the alkali reserve.

With the resultant production of oxygen hunger, it follows that localized application of oxygen to the affected areas should facilitate healing because of the biochemical changes which it effects through its advantageous influence on the local metabolism of the involved area. The oxygen thus reduces and controls the causative factors, facilitating initiation of the healing process.

The present invention is directed to a novel improvement in a scaling or planing instrument whereby oxygen may be so applied locally during such procedures as removing supra and subgingival irritants, deposits and foreign matter, and during like or similar procedures.

In my Patent No. 2,552,134 issued May 8, 1951, I have shown, described, and claimed a scaling or planing instrument, useful in such procedures, and comprising a flexible shank carrying a blade having flattened, wide front and rear surfaces co-terminating in a leading edge. The front and rear faces are concaved to accommodate convexed surfaces of the teeth, and the blade generally forms a plane and wedge structure for splitting subgingival irritants and adhering formations from the tooth structure. The blade is further characterized by rounded junctions of the front and rear faces to prevent accidental gum laceration.

In accordance with the present invention, a tool of this type is provided with a small diameter tube or conduit extending through a tubular flexible handle, along a tapered depth slot in the tapered end of the blade structure inserted in the shank, and along the neck of the blade to terminate at the inner edge of the front face of the blade. This tube or conduit, which is welded or brazed to the blade structure, is arranged to have its outer projecting end connected to a source of oxygen, direct a stream of oxygen along the blade face and to the localized areas affected by the scaling or planing procedures.

For an understanding of the invention principles, reference is made to the following description of a typical embodiment thereof as illustrated in the accompanying drawing.

Fig. 1 is a longitudinal sectional view through a scaling or planing instrument embodying the invention;

Fig. 2 is a front elevation view of the instrument; and

Figs. 3 and 4 are transverse sectional views on the correspondingly numbered lines of Fig. 1.

Referring to the drawings, the scaling or planing instrument 10 corresponds to that illustrated in my aforementioned patent, except as modified to incorporate the present invention. Furthermore, instrument 10 is utilized in the same operative procedure as described in said patent, the overall efficacy of the operative procedure, however, being increased by the oxygen applying improvement of the present invention.

The instrument 10 includes a tubular shank 15 which may be made of any suitable, and preferably flexible, material, such as plastic, Monel metal, stainless steel, or the like. Shank 15 includes an outer elongated substantially rectilinear section 11 having a substantially smooth exterior surface. Adjacent the inner end of the shank, the portion 11 is enlarged to form a tapered socket 12 whose exterior surface is formed for ready and sure gripping, as indicated at 13 (Fig. 2), and is provided with circumferential grooves 14.

The socket portion 12 serves as a recess seat for the tool or blade member 20. This blade member includes a tapered shank or stem portion 21 having a wedge fit in socket 14, and continued as a solid stem or neck section of decreasing diameter 22. The outer end of the tool or blade mounting structure is formed as a relatively small diameter angular stem 23 having a reversely bent portion 24 terminating in the blade 25. This blade had front and rear faces 26 and 27, each of which is made concave as at 28 so that blade 25 can readily accommodate itself to convex portions of the tooth surfaces. As described in said Patent 2,552,134, the blade 25 is formed with rounded edges and is generally wedge-shaped for ready use in splitting or planing off adhering formations and subgingival irritants from the tooth structure.

In accordance with the present invention, during operative manipulation of the instrument 10, wherein the blade 25 is moved between the tooth structure and adjacent gum structure, means are provided for directing a stream of oxygen at the localized areas affected by manipulating of instrument 10. This means comprises an elongated small diameter tube 30 of copper, brass, stainless steel, or similar material extending through the instrument from the outer end thereof to a point adjacent the inner end of one face of blade 25. Tube 30 includes a substantially rectilinear portion 31 extending through the rectilinear outer part 11 of shank 15 and beyond the shank as indicated at 32. Portion 32 of tube 30 is arranged to be connected to a suitable source of oxygen as usually available in a dentists office. As tube 10 emerges from the inner end of rectilinear shank portion 11, it is bent, as indicated at 33, to extend along the inner surface of socket portion 12.

The wedge portion 21 of tool or blade member 20 is formed with a slot 18 extending therealong to accommodate portion 33 of tube 30. The part of tube 30 extending beyond this slot is further bent outwardly, as at 34, to lie along stem 23 to which it is brazed or welded as indicated at 34. The inner end 35 of the tube is then bent inwardly to lie along one side of the neck or stem 24 of blade 25, with the discharge end of tube 30 terminating adjacent the junction of the blade and the neck 24.

The tube 30 thus directs oxygen along a surface of blade 25 so that the local areas affected by manipulation of the instrument, such as by insertion of blade 25 between a tooth and the adjacent gum structure, are flush with oxygen initiating a healing process as previously described.

Applicant is aware that it is old and well known to apply a non-therapeutic cooling fluid to the operating area of a rotating dental instrument, such as a drill, for example. However, such cooling fluid has hitherto been in the nature of air or water. On the other hand, the present invention has the novel feature of directing a therapeutic gaseous medium to the non-rotatable operating end of a dental instrument, such as a scaling or planing instrument.

While a specific embodiment of the invention has been shown and described in detail to illustrate the application of the invention principles, it should be understood that the invention may be otherwise embodied without departing from such principles.

What is claimed is:

1. A dental scaling or planing instrument comprising, in combination, an elongated tubular shank; a blade immovably secured to the inner end of said shank and having flattened wide front and rear faces and arranged for manipulation, by the shank, between a tooth and the adjacent gum structure; and a tube extending through said shank and having its inner end terminating inwardly of the outer edge of said blade and its outer end extending beyond said shank for connection to a source of oxygen to direct a stream of oxygen along the length of a face of said blade for localized application of oxygen during operative manipulation of said instrument.

2. A dental scaling or planing instrument comprising, in combination, an elongated tubular shank; a blade member immovably secured to the inner end of said shank and including a blade having flattened wide front and rear faces and arranged for manipulation, by the shank, between a tooth and the adjacent gum structure and a stem integral with said blade and fixedly secured with said shank; and a tube extending through said shank and having its inner end terminating inwardly of the outer edge of said blade and its outer end extending beyond said shank for connection to a source of oxygen to direct a stream of oxygen along the length of a face of said blade for localized application of oxygen during operative manipulation of said instrument.

3. An instrument as claimed in claim 2 in which said stem has a slot therealong receiving said tube.

4. An instrument as claimed in claim 2 in which said stem has a slot therealong receiving said blade member and said tube, said tube being rigidly adhered to said stem.

References Cited in the file of this patent

UNITED STATES PATENTS

| 2,552,134 | Berliner | May 8, 1951 |
| 2,685,737 | Leff | Aug. 10, 1954 |